United States Patent
Xu et al.

(10) Patent No.: US 8,089,752 B2
(45) Date of Patent: Jan. 3, 2012

(54) HARD DISK DRIVE HOLDER AND ELECTRONIC EQUIPMENT EMPLOYING THE SAME

(75) Inventors: Cai-Wen Xu, Shanghai (CN); Chih-Kai Chang, Taipei Hsien (TW)

(73) Assignees: Ambit Microsystems (Shanghai) Ltd., Shanghai (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 147 days.

(21) Appl. No.: 12/764,972

(22) Filed: Apr. 22, 2010

(65) Prior Publication Data

US 2011/0182023 A1 Jul. 28, 2011

(30) Foreign Application Priority Data

Jan. 27, 2010 (CN) .......................... 2010 2 0301614

(51) Int. Cl.
G06F 1/16 (2006.01)
H05K 7/00 (2006.01)
H05K 5/00 (2006.01)

(52) U.S. Cl. .......... 361/679.33; 361/679.37; 361/679.39

(58) Field of Classification Search . 361/679.33–679.39
See application file for complete search history.

(56) References Cited

U.S. PATENT DOCUMENTS

| | | | | |
|---|---|---|---|---|
| 6,166,901 A * | 12/2000 | Gamble et al. | ........... | 361/679.34 |
| 6,396,686 B1 * | 5/2002 | Liu et al. | ........... | 361/679.33 |
| 6,590,775 B2 * | 7/2003 | Chen | ........... | 361/725 |
| 6,798,653 B2 * | 9/2004 | Chen et al. | ........... | 361/679.33 |
| 6,882,526 B2 * | 4/2005 | Neukam et al. | ........... | 361/679.39 |
| 6,948,967 B2 * | 9/2005 | Scherer et al. | ........... | 439/377 |
| 7,006,351 B2 * | 2/2006 | Chen et al. | ........... | 361/679.34 |
| 7,198,338 B2 * | 4/2007 | Liu et al. | ........... | 312/223.1 |
| 7,345,237 B2 * | 3/2008 | Chen et al. | ........... | 174/50 |
| 7,495,904 B2 * | 2/2009 | Liang et al. | ........... | 361/679.39 |
| 7,639,490 B2 * | 12/2009 | Qin et al. | ........... | 361/679.34 |
| 2004/0075978 A1 * | 4/2004 | Chen et al. | ........... | 361/685 |
| 2005/0190535 A1 * | 9/2005 | Peng et al. | ........... | 361/685 |
| 2007/0230105 A1 * | 10/2007 | Su | ........... | 361/685 |
| 2008/0157638 A1 * | 7/2008 | Liu et al. | ........... | 312/223.2 |
| 2008/0158810 A1 * | 7/2008 | Liu et al. | ........... | 361/685 |
| 2008/0259554 A1 * | 10/2008 | Qin et al. | ........... | 361/685 |
| 2008/0278856 A1 * | 11/2008 | Peng et al. | ........... | 360/244.3 |
| 2009/0046419 A1 * | 2/2009 | Drake et al. | ........... | 361/685 |
| 2009/0059507 A1 * | 3/2009 | Peng et al. | ........... | 361/685 |

* cited by examiner

Primary Examiner — Jinhee Lee
Assistant Examiner — Adrian S Wilson
(74) Attorney, Agent, or Firm — Altis Law Group, Inc.

(57) ABSTRACT

A hard disk drive holder fixes hard disk drives in electronic equipment, and includes at least one handling assembly and a bracket for receiving the handling assemblies. Each of the handling assemblies is fixed to one of the hard disk drives to push or pull the hard disk drive into or out from the bracket for replacement or repair, and includes a handle and a pair of handle seats. The handle includes a holding portion and two extending portions including a convex block. Each of the handle seats includes a housing cavity and a spring clip. The spring clip includes a first stopper portion, a second stopper portion and a hook portion. The convex block is movable between the first stopper portion and the second stopper portion to limit movement range of the handle.

12 Claims, 5 Drawing Sheets

HARD DISK DRIVE HOLDER AND ELECTRONIC EQUIPMENT EMPLOYING THE SAME

BACKGROUND

1. Technical Field

The present disclosure relates to electronic equipment, and more particularly to a hard disk drive holder for the electronic equipment.

2. Description of Related Art

Electronic equipment, such as desktop computers, servers and Internet appliances, require a storage device, such as a hard disk drive, to store data. Generally, hard disk drives are directly fixed in an enclosure of the electronic device by screws, resulting in inconvenience when assembling or disassembling the hard disk drives. To make room for the tools needed to assemble and disassemble the hard disk drives, the size of the electronic equipment needs to be enlarged.

Therefore, a need exists in the industry to overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
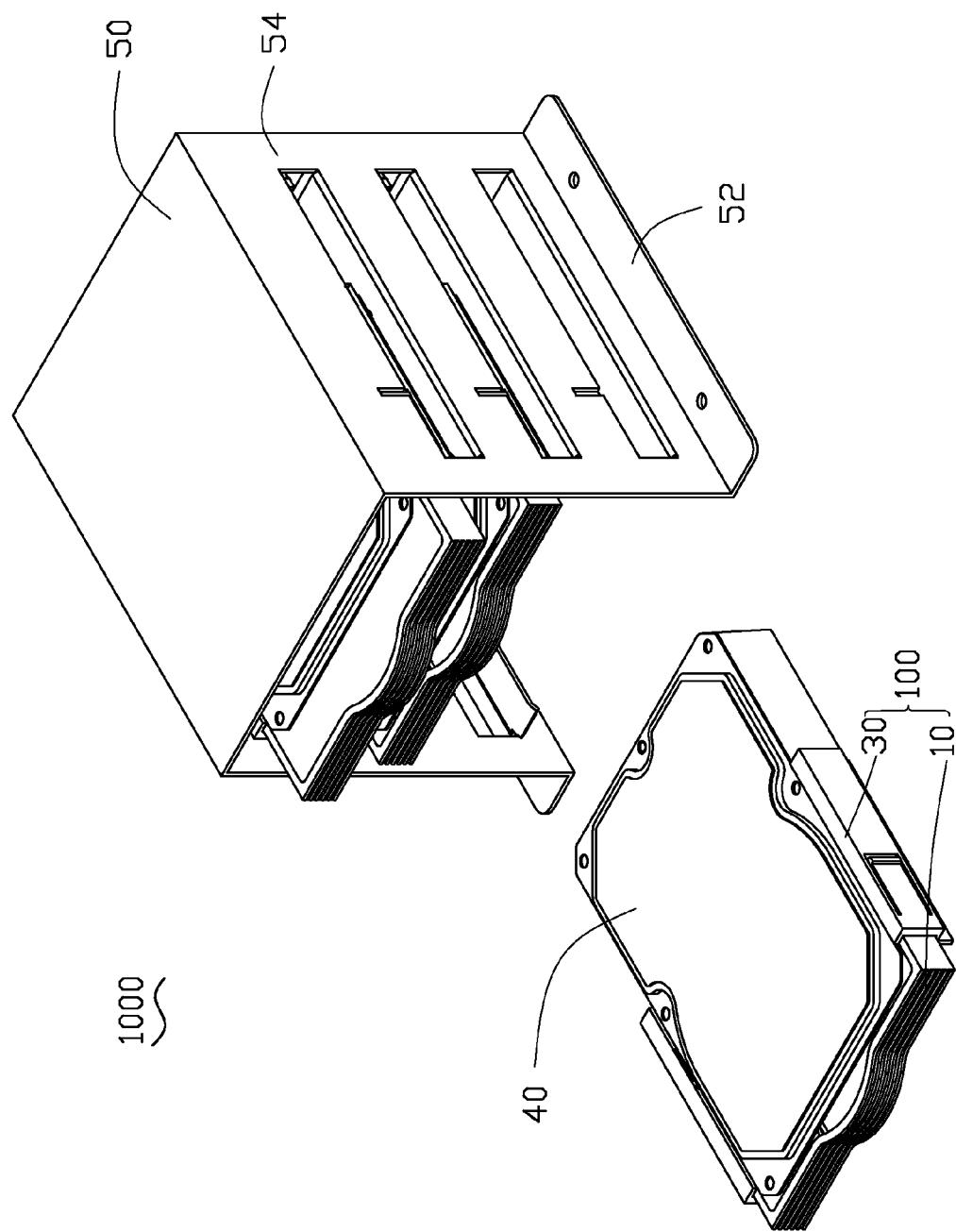
FIG. 1 is an isometric view of one embodiment of a hard disk drive holder in accordance with the present disclosure.

FIG. 1 is an isometric view of one embodiment of a hard disk drive holder 1000 in accordance with the present disclosure. The hard disk drive holder 1000 fixes a plurality of hard disk drives 40 in an electronic equipment, and comprises a plurality of handling assemblies 100 and a bracket 50 for receiving the plurality of handling assemblies 100. Each of the handling assemblies 100 is fixed to one of the corresponding plurality of hard disk drives 40 to push or pull the hard disk drive 40 into or out from the bracket 50 for replacement or repairing, respectively. Each of the handling assemblies 100 comprises a handle 10 and a pair of handle seats 30.

Figure 2:
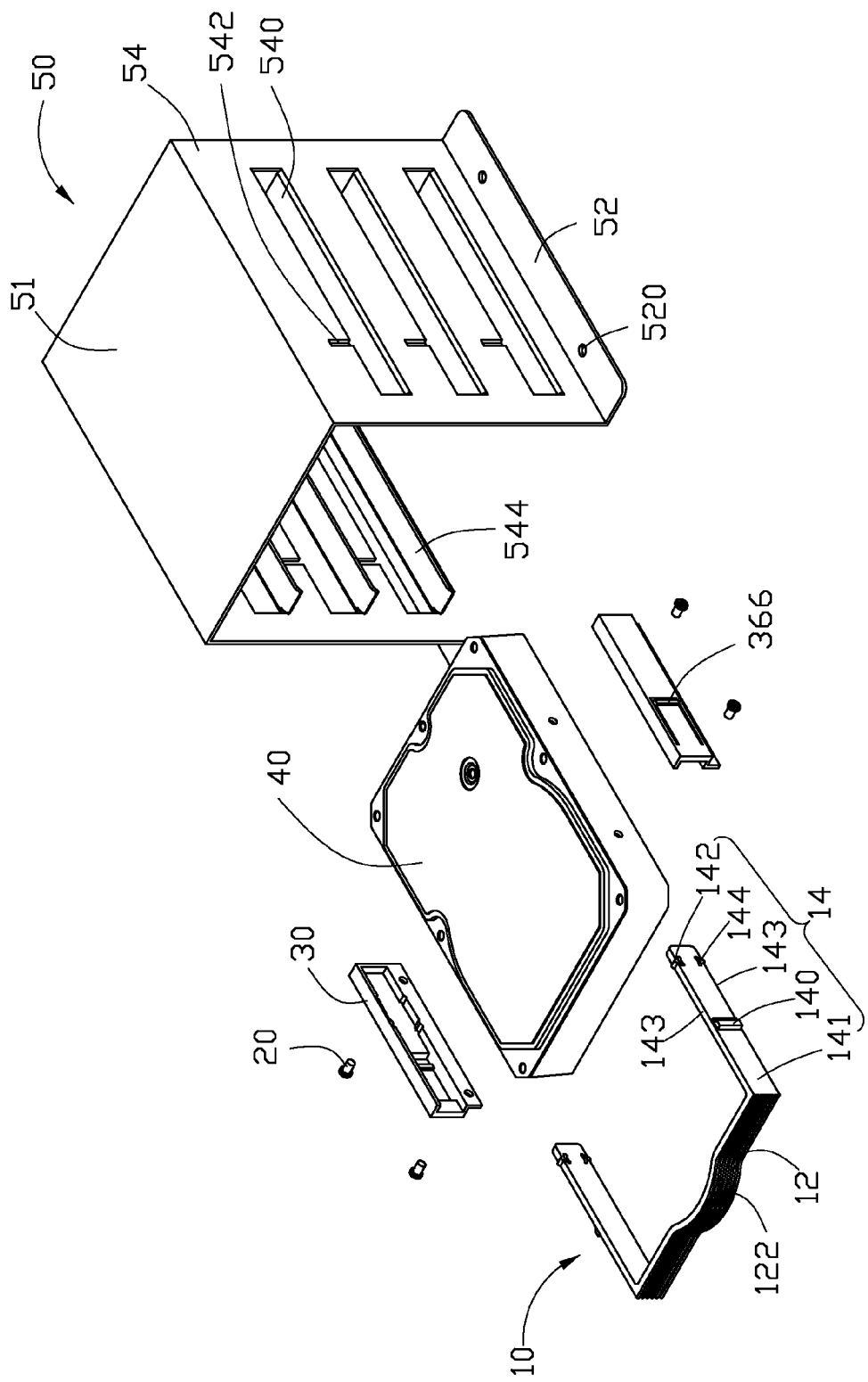
FIG. 2 is a disassembled perspective view of the hard disk drive holder in accordance with the present disclosure.

Referring to FIG. 2, the handle 10 comprises a holding portion 12 and two extending portions 14 extending in parallel from two ends of the holding portion 12 respectively, so that the handle 10 is in a substantial U shape. In the illustrated embodiment, the holding portion 12 is integrally formed with the extending portions 14. The holding portion 12 comprises an arcuate portion 122 configured at middle portion of the holding portion 12. In practical application, users can conveniently insert their fingers into the arcuate portion 122 to pull or push the hard disk drive 40 The hard disk drive 40 is disposed between the two extending portions 14. Each of the extending portions 14 comprises a convex block 140 protruding outwardly from an outer surface 141 of the extending portion 14, a pair of projections 142 disposed on two opposite edges 143 of the extending portion 14, and a pair of arcuate openings 144 corresponding to the pair of projections 142 respectively. In the illustrated embodiment, the convex block 140 is integrally formed with the extending portion 14. Each of the projections 142 protrudes from corresponding edge 143 and is in a substantial arc shape. The arcuate openings 144 are defined beside the pair of projections 142 respectively to enhance the flexibility of the projections 142.

Figure 3:
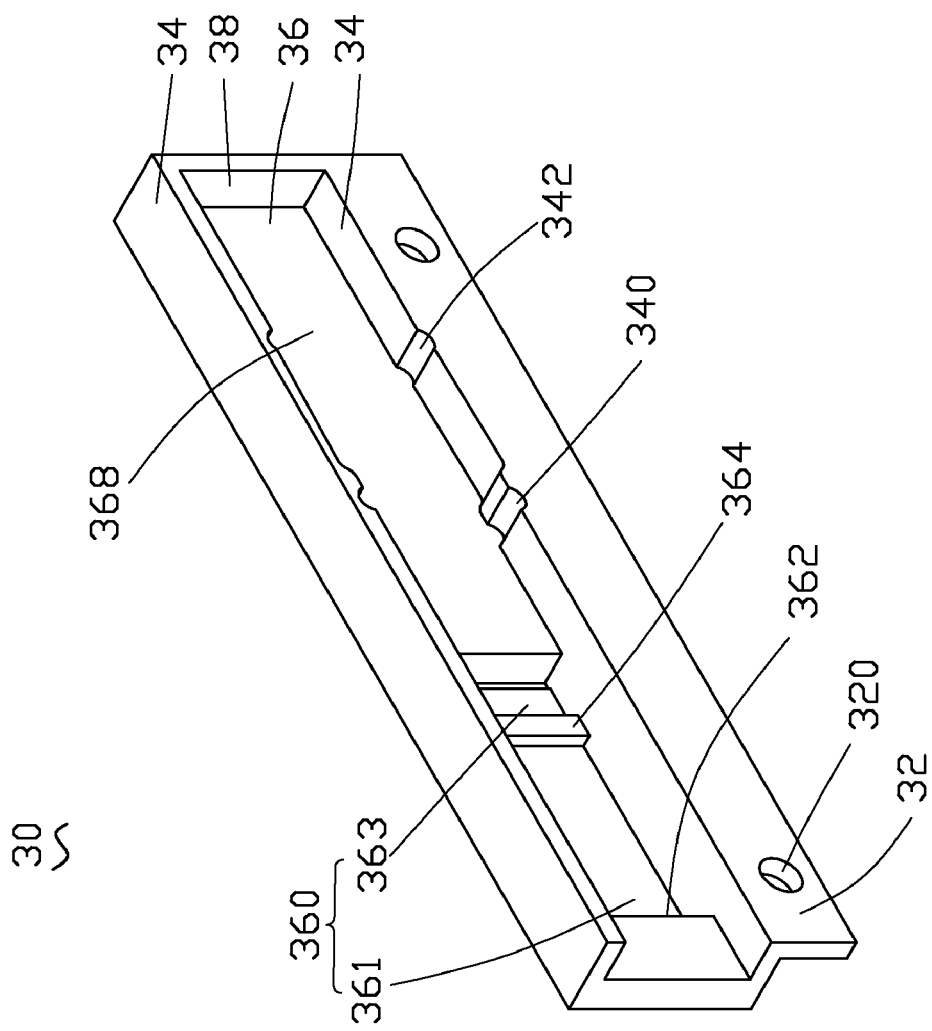
FIG. 3 is an isometric view of a handle seat of the hard disk drive holder of FIG. 1.

Each of the extending portions 14 is matched with one of the handle seats 30. Referring to FIG. 2 and FIG. 3, each of the handle seats 30 comprises a securing portion 32, two opposite sidewalls 34, a bottom wall 36 and a back wall 38. The securing portion 32 defines a plurality of screw holes 320 to mate with a plurality of screws 20 to secure the handling assembly 100 onto the hard disk drive 40. The two opposite sidewalls 34 and the back wall 38 are perpendicularly connected to the bottom wall 36. The two sidewalls 34 are opposite to each other in parallel, and one of the sidewalls 34 perpendicularly connects to the securing portion 32. The two sidewalls 34, the bottom wall 36 and the back wall 38 collectively define a housing cavity 368. The housing cavity 368 movably receives one of the two extending portions 14 of the handle 10. Each of the sidewalls 34 defines a first groove 340 and a second groove 342. The pair of first grooves 340 and the pair of second grooves 342 are on the two sidewalls 34 respectively. The first grooves 340 and the second grooves 342 communicate with the housing cavity 368 and are engaged with the projections 142 of the handle 10. When the projections 142 are received in the first grooves 340 or the second grooves 342, the handle 10 is in a pulled out state or a pushed in state, respectively.

The bottom wall 36 comprises a spring clip 360 integrally formed with the bottom wall 36. The spring clip 360 comprises a connecting end 361 and a free end 363. In the illustrated embodiment, a U-shaped slot 361 is defined around the spring clip 360 to enhance resilience of the spring clip 360. The connecting end 361 connects with the bottom wall 36 and includes a first stopper portion 362 protruding inwardly to the housing cavity 368. The free end 363 includes a second stopper portion 364 and a hook portion 366 configured at two opposite sides of the spring clip 360 respectively. The second stopper portion 364 protrudes inwardly to the housing cavity 368 and the hook portion 366 protrudes outwardly from the spring clip 360. The convex block 140 of the handle 10 is movable between the first stopper portion 362 and the second stopper portion 364, so that the convex block 140, the first stopper portion 362, and the second stopper portion 364 collectively limit the movement range of the handle 10. In the illustrated embodiment, the distance between the first grooves 340 and the second grooves 342 is equal to that between the first stopper portion 362 and the second stopper portion 364.

Referring to FIG. 2, the bracket 50 comprises a pair of retaining portions 52 and a pair of sidewalls 54 perpendicularly connected to a top panel 51. The pair of retaining portions 52 extends perpendicularly from the corresponding sidewalls 54, and each defines a plurality of holes 520. The holes 520 are used to fix the bracket 50 by accompanying fasteners, for example, screws. Each of the sidewalls 54 is punched to form a plurality of opening grooves 540. The punched portion is folded inwardly to form a plurality of supporting arms 544. The supporting arms 544 on the sidewalls 54 are correspondingly and systematically, and two corresponding supporting arms 544 respectively on the two sidewalls 54 collectively supporting one handling assembly 100 thereon. A plurality of latching grooves 542 each perpendicularly communicating with a corresponding one of the opening grooves 540 are defined in the sidewalls 54.

Figure 4:
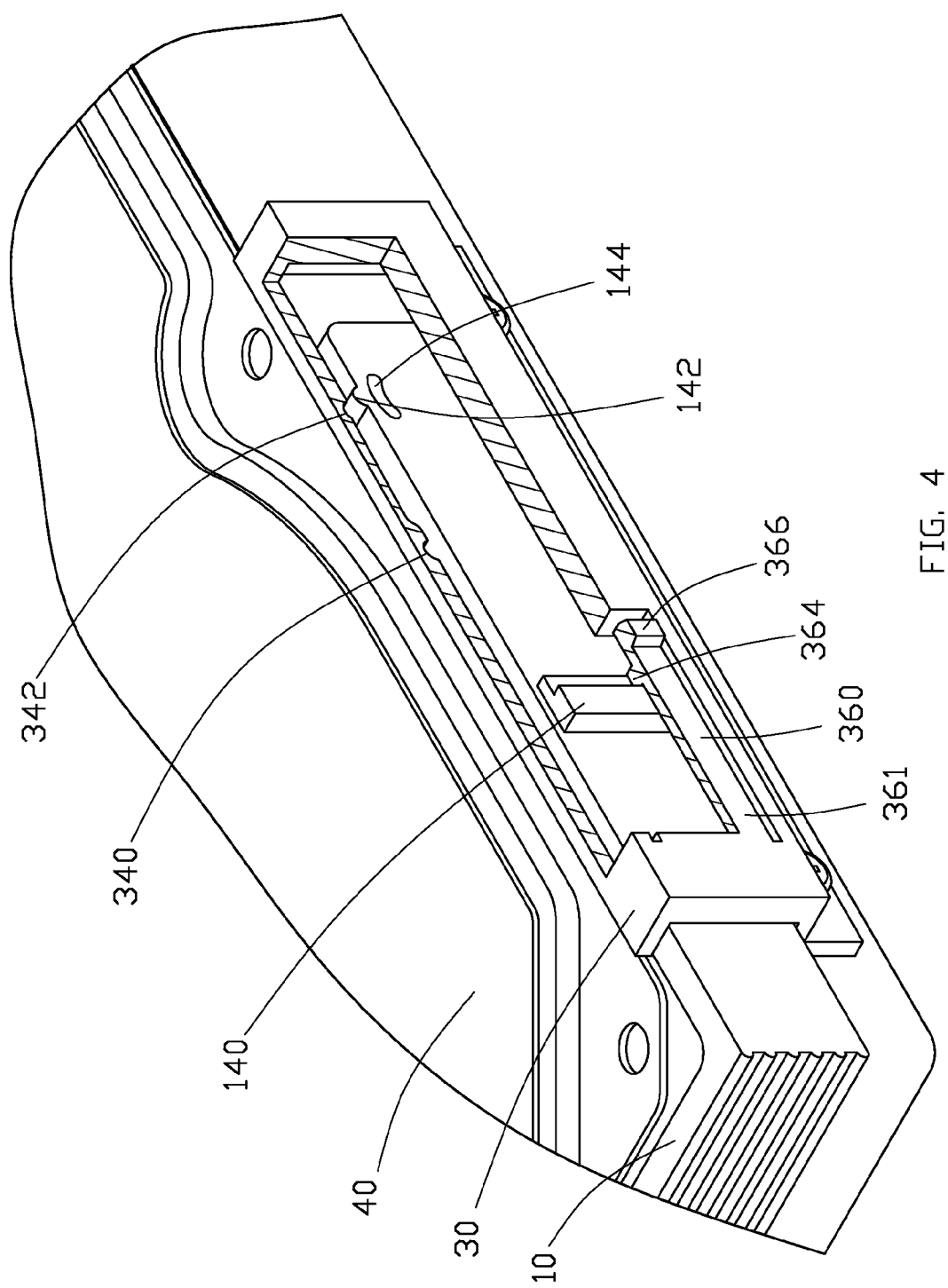
FIG. 4 is a partial cross-sectional view of pushing the handle into the handle seat in accordance with the present disclosure.

FIG. 4 illustrates the handle 10 being pushed into the pair of handle seats 30 according to an exemplary embodiment of the present disclosure. When the handle 10 is pushed into the pair of handle seats 30, the hard disk drive 40 moves into the bracket 50 along corresponding supporting arms 544. When the projections 142 of the handle 10 slide into the second grooves 342 of the pair of handle seats 30, the handle 10 stops moving and the convex blocks 140 resist the second stopper portions 364. The convex blocks 140 urge the spring clips 360 to latch the hook portions 366 into the latching grooves 542 of the bracket 50, to install the hard disk drives 40 onto the bracket 50.

Figure 5:
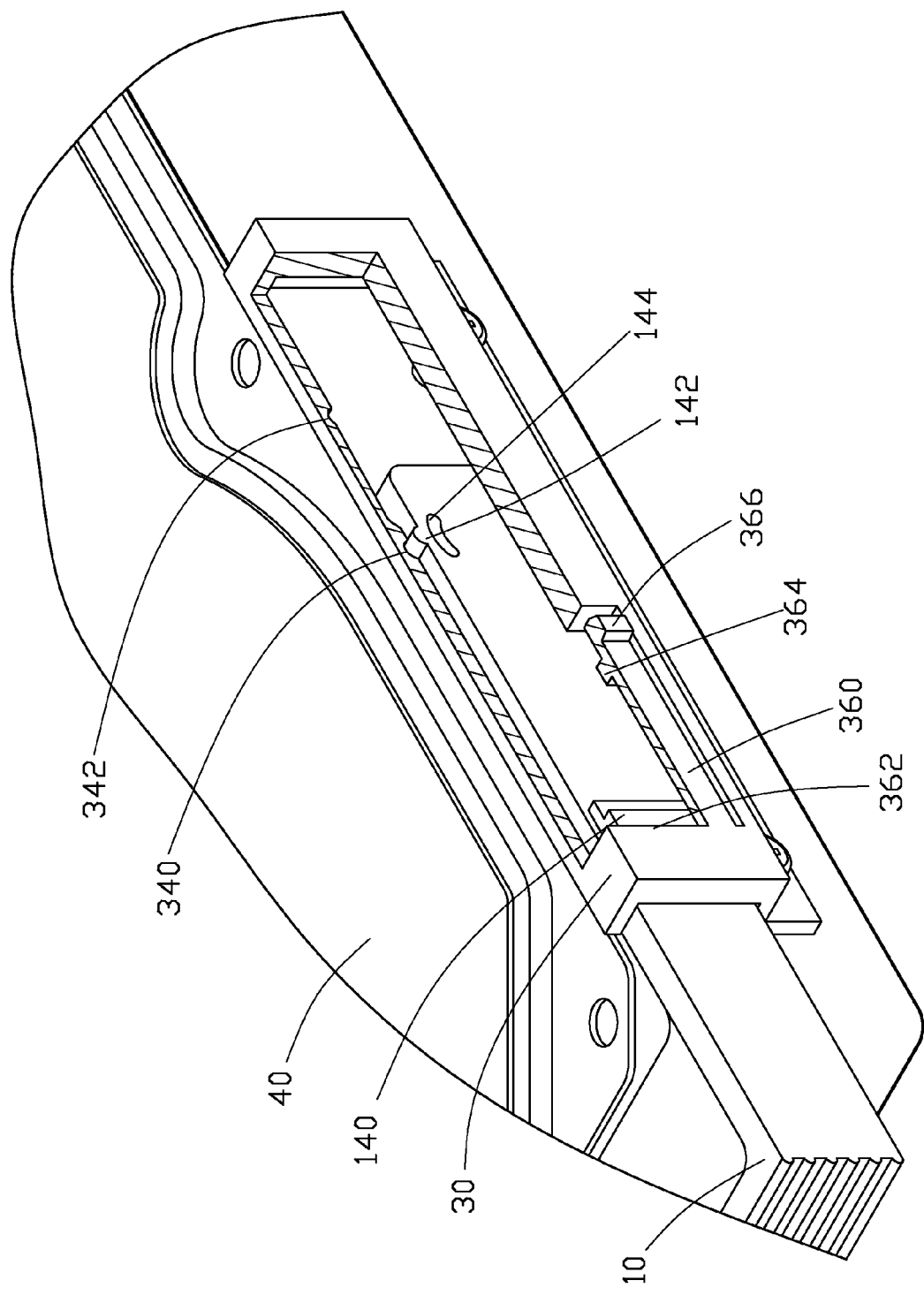
FIG. 5 is a partially cross-sectional view of pulling the handle out from the handle seat in accordance with the present disclosure.

FIG. 5 illustrates the handle 10 being pulled out from the pair of handle seats 30 according to an exemplary embodiment of the present disclosure. By pulling the handle 10 out under an external force, the projections 142 are pulled out from the second grooves 342 and mate with the first grooves 340 to make the handle 10 stop moving. Simultaneously, the convex blocks 140 move away from the second stopper portions 364, and the spring clips 360 are deformed inwardly to the housing cavities 368 under the external force, thereby the hook portions 366 disengage from the latching grooves 542. Therefore, the hard disk drive 40 with the handle assembly 100 is pulled out from the bracket 50 along the corresponding supporting arms 544.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A hard disk drive holder, comprising:
   at least one handling assembly, comprising:
      a handle, comprising a holding portion and two extending portions for receiving a hard disk drive, each of the extending portions comprising a convex block protruding outwardly from an outer surface of the extending portions; and
      a pair of handle seats, each of the handle seats comprising a housing cavity for movably receiving one of the two extending portions and a spring clip, wherein the spring clip comprises a connecting end and a free end, the connecting end comprising a first stopper portion protruding inwardly to the housing cavity, the free end comprising a second stopper portion protruding inwardly to the housing cavity and a hook portion protruding outwardly from the spring clip, and the convex block of the handle is movable between the first stopper portion and the second stopper portion to limit movement range of the handle; and
   a bracket, comprising a pair of sidewalls and each of the sidewalls being punched to form at least one supporting arm perpendicular to the corresponding sidewalls to support the at least one handling assembly;
   wherein when the hard disk drive is pushed to move into the bracket along the corresponding supporting arms, the convex blocks resist the second stopper portions and urge the spring clips to latch the hook portions into a latching grooves;
   when the hard disk drive is pulled out from the bracket along the corresponding supporting arms, the convex blocks move away from the second stopper portions, and the spring clips are deformed inwardly to the housing cavities, causing the hook portions to disengage from the latching grooves.

2. The hard disk drive holder as claimed in claim 1, wherein the handle further comprises a pair of projections disposed on two opposite edges of the extending portion, and each of the handle seats defines a pair of first grooves and a pair of second grooves communicating with the housing cavity, wherein when the hard disk drive is pulled out or pushed in, the projections are received in the first grooves or the second grooves, respectively.

3. The hard disk drive holder as claimed in claim 2, wherein each of the projections is in a substantially arc shape.

4. The hard disk drive holder as claimed in claim 3, wherein the handle further comprises a pair of arcuate openings corresponding to the pair of projections to enhance the flexibility of the projections.

5. The hard disk drive holder as claimed in claim 2, wherein the distance between the first grooves and the second grooves is equal to that between the first stopper portion and the second stopper portion.

6. The hard disk drive holder as claimed in claim 1, wherein the convex block is integrally formed with the extending portion.

7. An electronic equipment, comprising:
   at least one hard disk drive; and
   a hard disk drive holder, comprising:
      at least one handling assembly, comprising:
         a handle, comprising a holding portion and two extending portions for receiving the hard disk drive, each of the extending portions comprising a convex block protruding outwardly from an outer surface thereof; and
         a pair of handle seats, each of the handle seats comprising a housing cavity for movably receiving one of the two extending portions and a spring clip, wherein the spring clip comprises a connecting end and a free end, the connecting end comprising a first stopper portion protruding inwardly to the housing cavity, the free end comprising a second stopper portion protruding inwardly to the housing cavity and a hook portion protruding outwardly from the spring clip, and the convex block of the handle is movable between the first stopper portion and the second stopper portion to limit the movement range of the handle; and
      a bracket, comprising a pair of sidewalls and each of the sidewalls being punched to form at least one supporting arm perpendicular to the corresponding sidewalls to support the at least one handling assembly;
   wherein when the hard disk drive is pushed to move into the bracket along the corresponding supporting arms, the convex blocks resist the second stopper portions and urge the spring clips to latch the hook portions into a latching grooves;
   when the hard disk drive is pulled out from the bracket along the corresponding supporting arms, the convex blocks move away from the second stopper portions, and the spring clips are deformed inwardly to the housing cavities, thereby the hook portions disengage from the latching grooves.

8. The electronic equipment as claimed in claim 7, wherein the handle further comprises a pair of projections disposed on two opposite edges of the extending portion, and each of the handle seats defines a pair of first grooves and a pair of second grooves communicating with the housing cavity, wherein when the hard disk drive is pulled out or pushed in, the projections are received in the first grooves or the second grooves, respectively.

9. The electronic equipment as claimed in claim 8, wherein each of the projections is in a substantially arc shape.

10. The electronic equipment as claimed in claim 9, wherein the handle further comprises a pair of arcuate openings corresponding to the pair of projections to enhance the flexibility of the projections.

11. The electronic equipment as claimed in claim 8, wherein the distance between the first grooves and the second grooves is equal to that between the first stopper portion and the second stopper portion.

12. The electronic equipment as claimed in claim 7, wherein the convex block is integrally formed with the extending portion.

* * * * *